US010562603B2

(12) United States Patent
Roth et al.

(10) Patent No.: US 10,562,603 B2
(45) Date of Patent: Feb. 18, 2020

(54) AIRCRAFT INSULATION COMPONENT HAVING RECESSES FOR RECEIVING FRAMEWORK STRUCTURES

(71) Applicant: Airbus Operations GmbH, Hamburg (DE)

(72) Inventors: Ingo Roth, Hamburg (DE); Bernd Roschat, Hamburg (DE); Stephan Roepke, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 321 days.

(21) Appl. No.: 15/426,417

(22) Filed: Feb. 7, 2017

(65) Prior Publication Data
US 2017/0225762 A1     Aug. 10, 2017

(30) Foreign Application Priority Data
Feb. 9, 2016  (DE) ........................ 10 2016 201 928

(51) Int. Cl.
*B64C 1/06*      (2006.01)
*B64C 1/40*      (2006.01)

(52) U.S. Cl.
CPC .............. *B64C 1/066* (2013.01); *B64C 1/067* (2013.01); *B64C 1/40* (2013.01); *B64C 1/403* (2013.01); *B64C 1/406* (2013.01)

(58) Field of Classification Search
CPC .......... B64C 1/00; B64C 1/066; B64C 1/067; B64C 1/068; B64C 1/40; B64C 1/403; B64C 1/406; B64C 2001/0054
See application file for complete search history.

(56) References Cited

U.S. PATENT DOCUMENTS

| 4,291,851 A * | 9/1981 | Johnson | B32B 3/12 244/119 |
| 4,416,349 A * | 11/1983 | Jacobs | G10K 11/16 181/208 |
| 5,251,849 A * | 10/1993 | Torres | B29C 44/186 244/117 R |
| 5,509,247 A | 4/1996 | Fortez et al. | |
| 6,613,258 B1 * | 9/2003 | Maison | B29C 65/7882 264/102 |

(Continued)

FOREIGN PATENT DOCUMENTS

| DE | 10034990 A1 | 2/2002 |
| DE | 102011075774 | 11/2012 |

(Continued)

OTHER PUBLICATIONS

European Search Report; corresponding European Patent Application No. EP 17 15 3425.
German Search Report, dated Sep. 1, 2016, priority document.

*Primary Examiner* — Richard R. Green
*Assistant Examiner* — Michael A. Fabula
(74) *Attorney, Agent, or Firm* — Greer, Burns & Crain, Ltd.

(57) ABSTRACT

An insulation component to be attached to a fuselage structure of an aircraft. The insulation component extends in a planar manner, and at least one peripheral recess, running transversely to the at least one longitudinal recess, is formed in a first surface of the insulation component configured to receive a respective associated peripheral support of the fuselage structure.

15 Claims, 5 Drawing Sheets

(56) References Cited

U.S. PATENT DOCUMENTS

| | | | |
|---|---|---|---|
| 7,578,468 B2* | 8/2009 | Drost | B64C 1/066 |
| | | | 181/290 |
| 8,100,361 B2* | 1/2012 | Grauerholz | B64C 1/061 |
| | | | 244/119 |
| 8,662,448 B2 | 3/2014 | Weston et al. | |
| 9,751,290 B2* | 9/2017 | Lonsdorfer | B29C 31/008 |
| 9,764,519 B2* | 9/2017 | Lonsdorfer | B29C 31/008 |
| 2005/0044712 A1* | 3/2005 | Gideon | B60R 13/02 |
| | | | 29/897.32 |
| 2005/0211838 A1* | 9/2005 | Struve | B64C 1/40 |
| | | | 244/119 |
| 2005/0211839 A1 | 9/2005 | Movsesian et al. | |
| 2008/0111024 A1* | 5/2008 | Lee | B64C 1/068 |
| | | | 244/121 |
| 2010/0038487 A1* | 2/2010 | Kolax | B64C 1/068 |
| | | | 244/119 |
| 2010/0044512 A1 | 2/2010 | Paul | |
| 2012/0187245 A1 | 7/2012 | Goehlich | |
| 2012/0305706 A1 | 12/2012 | Weston et al. | |
| 2013/0240668 A1* | 9/2013 | Holm | B64C 1/067 |
| | | | 244/1 N |
| 2014/0079905 A1* | 3/2014 | Frankenberger | B64C 1/066 |
| | | | 428/131 |
| 2014/0134389 A1 | 5/2014 | Humfeldt et al. | |
| 2015/0144734 A1 | 5/2015 | Savian et al. | |
| 2016/0101576 A1 | 4/2016 | Joern | |
| 2017/0144743 A1* | 5/2017 | Dickson | B64C 1/40 |

FOREIGN PATENT DOCUMENTS

| | | |
|---|---|---|
| DE | 102013218520 | 3/2015 |
| EP | 0758603 A2 | 2/1997 |
| EP | 2730495 A2 | 2/1997 |
| EP | 2857186 A2 | 4/2015 |
| WO | 2014008507 A2 | 1/2014 |

* cited by examiner

AIRCRAFT INSULATION COMPONENT HAVING RECESSES FOR RECEIVING FRAMEWORK STRUCTURES

CROSS-REFERENCES TO RELATED APPLICATIONS

This application claims the benefit of the German patent application No. 102016201928.7 filed on Feb. 9, 2016, the entire disclosures of which are incorporated herein by way of reference.

FIELD OF THE INVENTION

The present invention relates to an insulation component to be attached to a fuselage structure of an aircraft.

BACKGROUND OF THE INVENTION

Passenger cabins or holds of vehicles, particularly of aircraft, are generally formed by a fuselage structure which defines an interior of the vehicle. In most cases, an insulation layer for sound insulation and heat insulation of the interior is attached to a side of the fuselage structure which faces the interior.

DE 10 2011 075 774 A1 discloses a panel for insulating an interior of an aircraft, which panel is inserted between two peripheral reinforcements of a fuselage structure of the aircraft.

SUMMARY OF THE INVENTION

It is one of the ideas of the present invention is to provide an insulation component which is light-weight and can be fixed easily and reliably to a fuselage structure.

According to a first aspect of the invention, an insulation component is provided for attaching to a fuselage structure of an aircraft, the insulation component extending in a planar manner in a longitudinal direction of the component, and at least one peripheral recess, which extends in a peripheral direction of the component, being formed in a first surface of the insulation component for receiving a respective associated peripheral support of the fuselage structure.

Due to the at least one peripheral recess, the insulation component can extend over a plurality of fuselage longitudinal portions or former fields which are defined by peripheral supports positioned adjacently in a longitudinal direction of the fuselage. As a result, with a given size of the fuselage structure, the number of insulation components or insulation panels required for insulating an interior defined by a fuselage structure is advantageously reduced, thereby necessitating fewer assembly procedures. Furthermore, in this way, with a given size of the fuselage structure, the number of contact surfaces, at which two insulation components positioned adjacently in the longitudinal direction of the fuselage respectively meet, is reduced. Consequently, the impermeability of the insulation is improved, because the number of areas in which condensed water can possibly penetrate the interior is thus reduced.

It can be provided that the insulation component also has at least one longitudinal recess, running along the longitudinal direction of the component and transversely to the at least one peripheral recess, to receive a respective associated longitudinal support of the fuselage structure.

The at least one longitudinal recess makes it possible to receive longitudinal supports of a fuselage structure in these recesses. This mounting can be performed particularly advantageously, for example with an interlocking fit and/or a force fit, in order to fix the insulation component to the fuselage structure in a simple and efficient manner.

The at least one longitudinal recess can have in particular an L-shaped cross-sectional shape to receive an extension formed on the first longitudinal support. As a result, a longitudinal support of the fuselage structure can be received particularly advantageously with a force fit and/or an interlocking fit in the longitudinal recess in the insulation component, as a result of which the insulation component is advantageously fixed reliably to the fuselage structure. Furthermore, the insulation component is reinforced in this way by the longitudinal support in the state attached to the fuselage structure. This has the advantage that the insulation component itself can be formed with a relatively low rigidity, for example with a relatively low density, thereby reducing the weight of the insulation component.

The longitudinal recesses in the insulation component can be formed in the peripheral direction of the component with mutual spacings in particular in a range of from 10 cm to 100 cm.

Furthermore, it can be provided that line recesses for receiving line components or for the formation at least in part of a line duct are formed in a second surface of the insulation component which is oriented opposite the first surface.

The line recesses optionally have a respective cross-sectional shape which forms an undercut with respect to a thickness direction of the component. In particular, balloon-shaped, Ω-shaped or wedge-shaped cross-sectional shapes as well as U-shaped, V-shaped or rectangular cross-sectional shapes can be provided with respect to the thickness direction of the component.

Fixing recesses which run along relative to one another can be formed in the second surface of the insulation component to receive fixing portions of line half-shells. This has the advantage that a line half-shell can be fixed on the insulation component to form a line duct. In this way, a duct for receiving line components or for conveying fluid can be formed, which duct has a large cross section, and no reduction, or just a small reduction in the thickness of the insulation component is required for this purpose in this region. Consequently, the rigidity of the insulation component is not impaired or is only insignificantly impaired due to the installation of lines in the insulation component.

The fixing recesses can advantageously have a respective cross-sectional shape which forms an undercut with respect to a thickness direction of the component. Here as well, for example balloon-shaped, Ω-shaped or wedge-shaped cross-sectional shapes can be provided with respect to the thickness direction of the component.

Furthermore, it can be provided that a large number of condensed water recesses are formed in the first surface of the insulation component, which recesses respectively run in the peripheral direction of the component. It is thereby possible for condensed water, which may occur on the first surface of the insulation component, to be diverted to a collection point in the peripheral direction of the component. This measure prevents condensed water from flowing uncontrollably along the longitudinal direction of the component and from potentially penetrating, in undesirable areas, inside the space between two insulation components, arranged adjacently in the longitudinal direction of the fuselage, from where it could possibly drip into the interior.

If the insulation component has at least one longitudinal recess, it can be provided that the condensed water recesses end at the at least one longitudinal recess. In particular, it can be provided that the condensed water recesses end at the at least one longitudinal recess, i.e., for example, they run into the longitudinal recess, such that condensed water can be collected in the at least one longitudinal recess. Consequently, condensed water on the first surface can be diverted to the at least one longitudinal recess and can be collected therein. In this case, the longitudinal recess forms a collection point. However, a collection point can also be formed, for example, by a diversion configured on the fuselage structure.

In the variant of the insulation component in which the condensed water recesses end in the at least one longitudinal recess in the insulation component, it is particularly advantageous for condensed water to be transported from basically any point on the first surface to a respective longitudinal recess. The condensed water recesses may, in particular, extend between two longitudinal recesses of the insulation component which are positioned adjacently in the peripheral direction of the component. This has the advantage that condensed water is reliably diverted even with different orientations of the insulation component with the component peripheral direction relative to the direction of gravity.

The condensed water recesses may, in particular, have a depth of between 0.5 mm and 6 mm with respect to the component thickness direction, and a width of between 1 mm and 10 mm with respect to the component peripheral direction. An effective removal of the condensed water is ensured within these depth and width ranges. Furthermore, these dimensions provide a weight reduction at which the geometrical moment of inertia and thereby the rigidity of the insulation component with respect to bending about an axis running in the component longitudinal direction are simultaneously increased.

The insulation component can also have a drainage duct for condensed water which extends between the at least one longitudinal recess and a respective peripheral recess.

Furthermore, it can be provided that a cover portion is configured on a first peripheral end portion, with respect to the component peripheral direction, of the insulation component, which cover portion projects or protrudes in the component peripheral direction from an end face, extending in the component longitudinal direction, of the insulation component and continues the first surface of the insulation component. As a result, a plurality of insulation components can be advantageously positioned adjacently to one another in the component peripheral direction in an installed state such that the cover portion overlaps an edge portion of the first surface of the adjacently positioned insulation component. This measure can advantageously prevent condensed water from penetrating inside a region located between the insulation components with respect to the component peripheral direction.

In particular, the insulation component can be formed from a thermoplastic foam material. This material may, for example, be a closed-pore foam material. The advantage of such foam materials is that they have a relatively high rigidity relative to the density and are also elastically deformable. In particular, foam materials based on polyvinylidene fluoride, abbreviated to PVDF, are possible.

The first surface of the insulation component optionally has a convex curvature in the component peripheral direction. This measure improves the transportation of condensed water on the first surface of the insulation component because condensed water recesses, which are optionally provided, are thereby always oriented obliquely to the direction of gravity, at least in portions.

The first surface of the insulation component can have a flame-retardant coating. Consequently, in the event of fire, with the insulation component, inadmissible temperature conditions in an interior which is insulated by insulation components according to the invention are prevented from developing, at least for a sufficiently long period of time.

As used herein, the expression a "continuous course" of a surface is generally understood as meaning that the contour line which is produced with a cross section normal to the surface and which defines the course of the surface can be differentiated at any point, i.e., in particular, it does not have any points of discontinuity.

The term "discontinuity" or a "non-continuous course" of a surface is generally understood herein as meaning that the contour line which is produced with a cross section normal to the surface and which defines the course of the surface cannot be differentiated at at least one point, i.e., for example, it has a point of discontinuity.

With regard to directional information and axes, in particular, directional information and axes which relate to the course of physical structures, here a course of an axis, of a direction or of a structure "along" another axis, direction or structure is understood as meaning that they, in particular the tangents resulting in a respective location of the structures, respectively extend at an angle of less than or equal to 45 degrees, preferably less than or equal to 30 degrees and particularly preferably parallel to one another.

With regard to directional information and axes, in particular directional information and axes which relate to the course of physical structures, here a course of an axis, of a direction or of a structure "transverse" to another axis, direction or structure is understood as meaning that they, in particular the tangents resulting in a respective location of the structures, respectively extend at an angle of more than or equal to 45 degrees, preferably more than or equal to 60 degrees and particularly preferably vertical to one another.

BRIEF DESCRIPTION OF THE DRAWINGS

In the following, the invention is described with reference to the figures of the drawings, in which.

In the drawings, the same reference signs denote identical or functionally identical components, unless indicated otherwise.

DETAILED DESCRIPTION OF THE PREFERRED EMBODIMENTS

Figure 1:
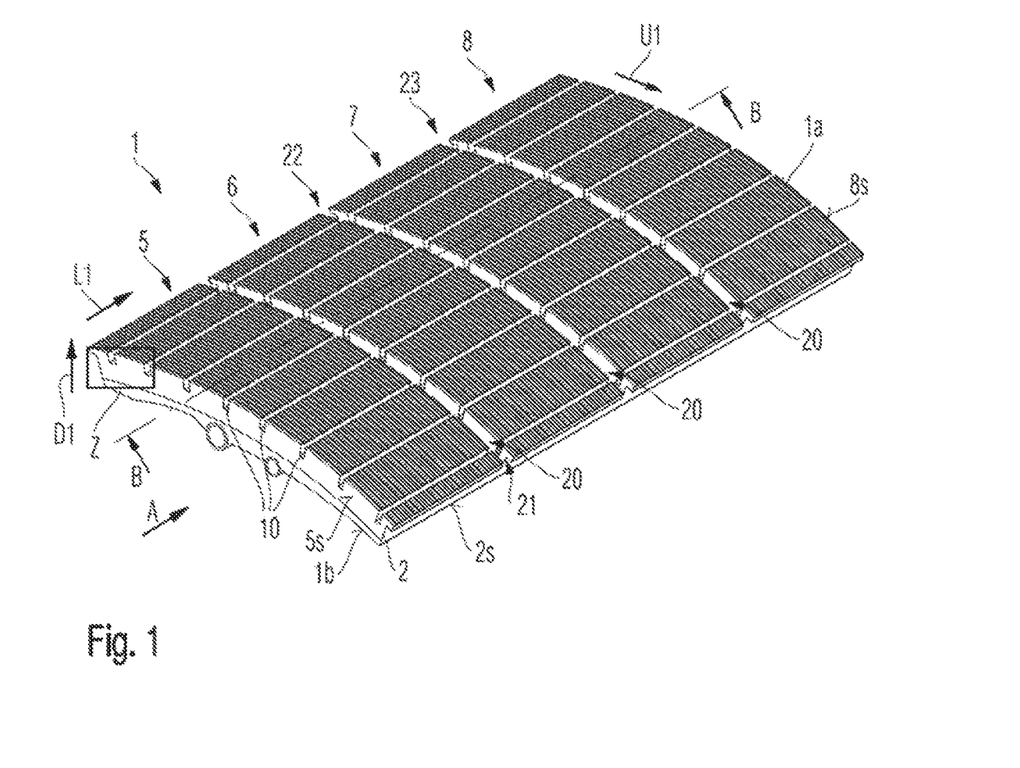
FIG. 1 is a perspective view of an insulation component according to one embodiment of the present invention.

FIG. 1 shows an insulation component 1 which is provided to be attached to a fuselage structure of an aircraft. The fuselage structure can be formed, in particular, by structural components B which form an interior I and on the side of which facing the interior I are fixed or formed support components. Longitudinal supports S extending along a fuselage longitudinal axis, for example in the form of stringers, and peripheral supports extending in a fuselage peripheral direction, for example in the form of formers, can be provided, in particular, as support components.

Figure 11:
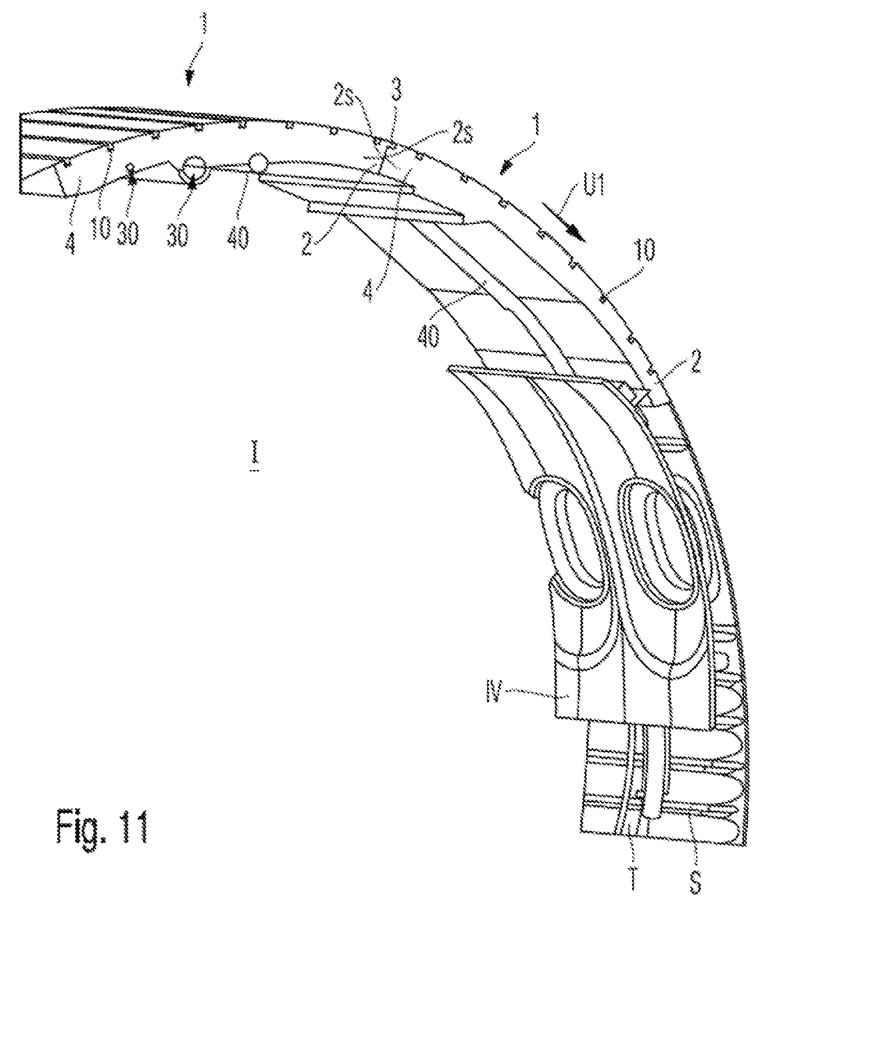
FIG. 11 is a perspective view of a possible installed state of the exemplary insulation components.

As shown in FIGS. 1 and 11, the insulation component 1 is formed, in particular, as a panel-shaped or shell-shaped body which extends in a planar manner in a component longitudinal direction L1. In a state in which the insulation component 1 is fixed to a fuselage structure, the component longitudinal direction L1 extends, in particular, along the fuselage longitudinal axis of the fuselage structure. Furthermore, the insulation component 1 extends in a component peripheral direction U1 running transversely to the component longitudinal direction L1. In a state in which the insulation component 1 is fixed to a fuselage structure, the component peripheral direction U1 extends, in particular, along the fuselage peripheral direction of the fuselage structure.

As FIG. 1 shows, the insulation component 1 according to the invention has on the first surface 1a which, in the installed state of the insulation component 1, faces the fuselage structure, at least one peripheral recess 20 which runs in the component peripheral direction U1 and is formed to receive a respective associated peripheral support of the fuselage structure.

The at least one peripheral recess 20 defines, with respect to the component longitudinal direction L1, at least two fields or component longitudinal portions 5, 6, 7, 8 of the insulation component 1. The insulation component 1 shown in FIG. 1 has four component longitudinal portions 5, 6, 7, 8. Here, a first component longitudinal portion 5 with respect to the component longitudinal direction L1 extends between a first longitudinal end face 5s, located on a first longitudinal end portion, of the insulation component 1 and the first peripheral recess 21 in the component longitudinal direction L1. A second component longitudinal portion 6 extends between the first peripheral recess 21 and a second peripheral recess 22 located adjacently in the component longitudinal direction L1. A third component longitudinal portion 7 extends between the second peripheral recess 22 and a third peripheral recess 23 located adjacently in the component longitudinal direction L1. A fourth component longitudinal portion 8 extends between the third peripheral recess 23 and a second longitudinal end face 8s of the insulation component 1, positioned on a second longitudinal end portion of the insulation component 1, the second longitudinal end face 8s being oriented opposite the first longitudinal end face 5s and the second longitudinal end portion of the insulation component 1 being positioned opposite the first longitudinal end portion of the insulation component 1.

In addition to the at least one peripheral recess 20, it is also possible for at least one longitudinal recess 10 to be formed in the first surface 1a of the insulation component 1, which surface faces the fuselage structure in the installed state of the insulation component 1, said longitudinal recess running along the component longitudinal direction L1 and, in particular, transversely to the at least one peripheral recess 20, to receive a respective associated longitudinal support S of the fuselage structure.

Figure 2:
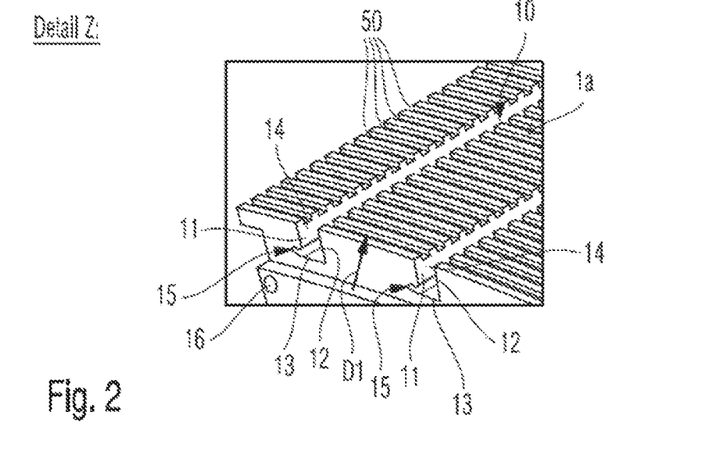
FIG. 2 is a detailed view of the region, identified by character Z, of the insulation component shown in FIG. 1.
Figures 5, 6:
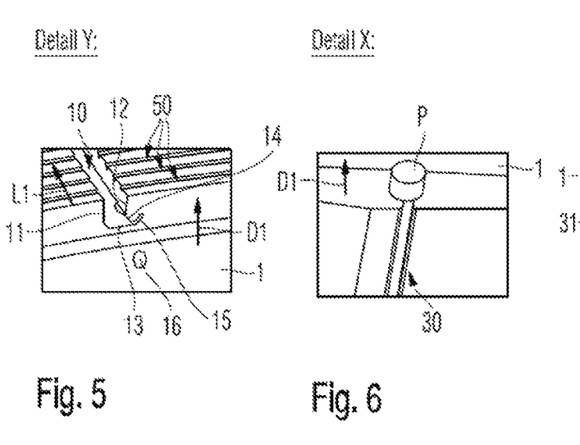
FIG. 5 is a detailed view of the region, identified by character Y, of the insulation component shown in FIG. 4.
FIG. 6 is a detailed view of the region, identified by character X, of the insulation component shown in FIG. 4.
Figure 9:
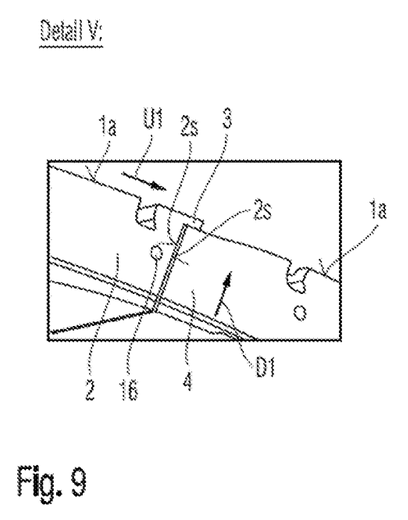
FIG. 9 is a detailed view of the region, identified by character V, of the arrangement, shown in FIG. 8, of insulation components according to embodiments, a first overlap state of the insulation components being shown.

As shown in particular in FIGS. 2, 5 and 9, seen in the component longitudinal direction L1, the at least one longitudinal recess 10 can have, for example, an L-shaped cross-sectional shape which is configured to receive an extension formed on the first longitudinal support S. The longitudinal recess 10 can be formed, in particular, by two mutually opposite recess side walls 11, 12 which extend in a component thickness direction D1 and which, seen in the component longitudinal direction L1, define a main portion of the recess, and by a base 13 of the recess which extends transversely to the recess side walls 11, 12 and which, seen in the component longitudinal direction L1, defines a side portion. The side portion forms a fixing slot 15, extending transversely to the side wall 11, 12, between an end portion 14 in respect of the component thickness direction D1 of one of the recess side walls 11, 12 and the base 13 of the recess. An extension formed on the first longitudinal support S can be fixed with an interlocking fit and/or a force fit in the fixing slot 15.

Here, it can be provided, in particular, that the side portion of the longitudinal recess 10 has a curved or bent cross-sectional shape at a proximal end or end portion, particularly in the region of the fixing slot 15. As shown in FIG. 5, the fixing slot 15 can run, in particular, obliquely to the portion of the groove base 13 which extends between the recess side walls 11, 12. This has the advantage that an extension of the longitudinal support S, which is inserted into the fixing slot 15 or into the side portion of the respective longitudinal recess 10, causes an elastic deformation of the material of the insulation component 1, forming the fixing slot 15, as a result of which a restoring force acts on the extension of the longitudinal support S. In this way, the insulation component 1 can be fixed relative to the longitudinal support S and thereby with respect to the fuselage structure.

The longitudinal recesses 10 are generally configured to receive a longitudinal support S of a fuselage structure with an interlocking fit and/or a force fit.

This type of fixing has the particular advantage that it is possible to mostly or completely dispense with additional attachments of the insulation component 1 to the fuselage structure. This leads, in particular, to a weight reduction, because only a few or no fastening devices, such as brackets, screws, rivets or the like, are required for further attachment.

Due to the fact that the insulation component 1 has at least one peripheral recess 20, as previously stated, the insulation component 1 has at least two component longitudinal portions 5, 6, 7, 8. In this way, a plurality of fuselage longitudinal portions, defined by respectively two peripheral supports, of a fuselage structure can be insulated by a single insulation component 1. Consequently, with a given size of the fuselage structure, the time required for assembling the insulation components 1 is reduced. In addition, if longitudinal recesses 10 are formed in the first surface 1a of the insulation component 1 to receive longitudinal supports S of the fuselage structure, they can be used particularly advantageously to fix the insulation component 1 to the fuselage structure.

Figure 12:
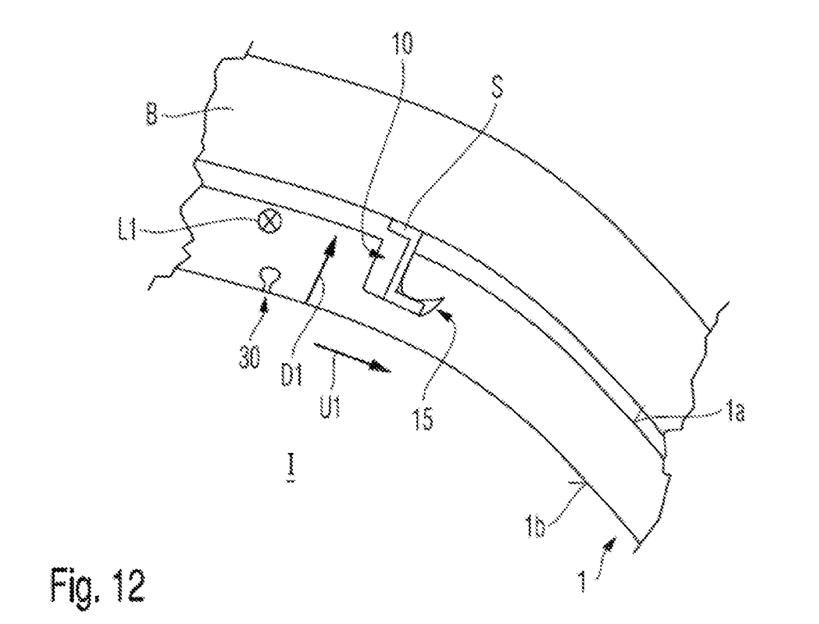
FIG. 12 is a schematic illustration in a plan view of the attachment of an insulation component according to an embodiment of the present invention to a fuselage structure according to the view of FIG. 4.

In particular, if the longitudinal recesses 10 have an L-shaped cross-sectional shape, as shown in FIGS. 2 and 5, the insulation component 1 can be attached to the fuselage structure in a particularly advantageous manner, in that the insulation component 1 is placed with the longitudinal recesses 10 on respectively associated longitudinal supports S in the component thickness direction D1, as shown in FIG. 12, and the peripheral recesses 20 receive a respective associated peripheral support (not shown). For attachment, an extension of the longitudinal support S is inserted into the fixing slot 15 or into the side portion of the L-shaped cross section of the respective longitudinal recess 10. During assembly of the insulation component 1, the extension of the longitudinal support S can be inserted, for example by moving the insulation component 1 in or against the component peripheral direction U1. The extension of the longitudinal support S causes an elastic deformation of the material of the insulation component 1 forming the fixing slot 15, as a result of which a restoring force acts on the extension of the longitudinal support S. In this way, the insulation component 1 can be fixed relative to the longitudinal support S and thereby with respect to the fuselage structure. As an alternative or in addition, the insulation component 1 can be attached to at least one peripheral support, for example by screwing a screw through the peripheral support into one of the longitudinal end faces 5s, 8s of the insulation component 1.

As already described, the longitudinal recesses 10 are configured to receive a longitudinal support S of a fuselage structure with an interlocking fit and/or a force fit. It is thereby possible for the insulation component 1 to be fixed to the fuselage structure over its entire extent in the component longitudinal direction L1, i.e., over its entire longitudinal extent. In this way, the insulation component 1 is reinforced by the fuselage structure in the assembled state. This has the advantage that the insulation component 1 can have a great longitudinal extent, i.e., it can extend over a plurality of fuselage longitudinal portions or former fields, without additional demands being made on the rigidity of the insulation component 1. In particular, the thickness of the insulation component 1 can be chosen to be relatively low, thereby advantageously resulting in a low component weight.

The at least one peripheral recess 20 can have a cross-sectional shape which is adapted to the cross-sectional shape of the associated peripheral support of the fuselage structure, for example a rectangular, U-shaped or V-shaped cross-sectional shape or the like. In this respect, it can be provided, in particular, that at least one peripheral recess 20 of the insulation component 1 has a width, in respect of the component longitudinal direction L1, which is greater than the width of the peripheral support to be received. As a result, condensed water which collects in the peripheral recesses 20 can be diverted therein. As an alternative or in addition to the fact that the peripheral recess 20 can have a greater width than the peripheral support to be received, grooves which run in the component longitudinal direction L1 can be formed in the peripheral recesses 20 for this purpose.

Figure 4:
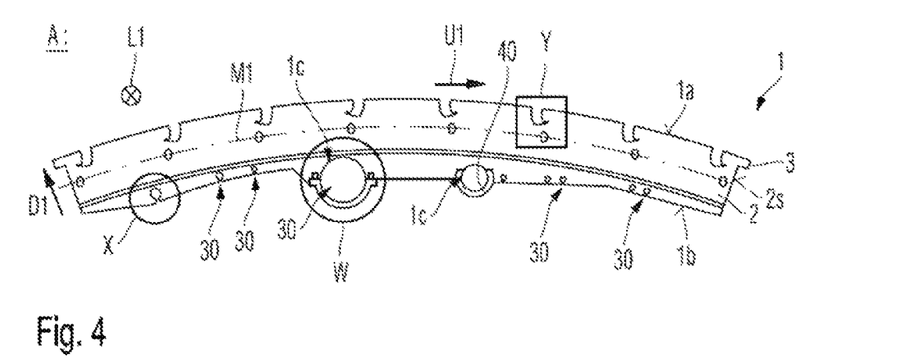
FIG. 4 is a plan view of an end face of the insulation component shown in FIG. 1, the view arising from the viewing direction A marked in FIG. 1.
Figure 7:
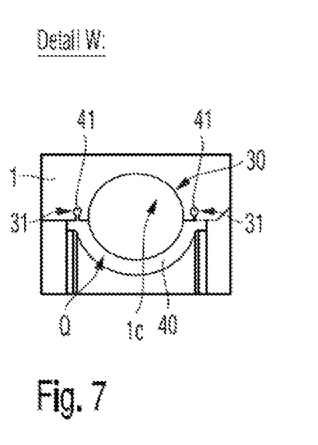
FIG. 7 is a detailed view of the region, identified by character W, of the insulation component shown in FIG. 4.

As shown particularly in FIGS. 4, 6 and 7, the insulation component 1 can have line recesses 30. These are provided for receiving line components P, such as cable harnesses, pipes or the like, as shown in FIG. 6. Furthermore, the line recesses 30 can be configured to at least partly form a line duct Q, as shown in FIG. 7 and which will be described in more detail later on.

The line recesses 30 are formed in a second surface 1b of the insulation component 1 which is oriented opposite the first surface 1a, and they can run according to the requirements of the line duct. The course of the line recesses 30 defines the course of the line components P or of the line duct Q in the insulation component 1. This has the advantage that no attachment points or mounts for attaching the line components and line ducts P, Q to the fuselage structure have to be provided for laying line components and line ducts P, Q in the interior I of an aircraft. This leads to a reduction in weight of the aircraft which is fitted with insulation components 1 according to the invention. Since the line recesses 30 are particularly simple to produce, for example by directly forming during the shaping of the insulation component 1 or by subsequently introducing by means of material removal and/or material deformation, the line duct can be easily adapted, for example to specific customer requirements or to different types of aircraft, without having to make changes to the fuselage structure.

Since the longitudinal recesses 10 are formed to receive a longitudinal support S of a fuselage structure with an interlocking fit and/or a force fit, and the insulation component 1 can be fixed thereby to the fuselage structure over its entire extent in the component longitudinal direction L1, the introduction of the line recesses 30, which basically leads to a reduction in the rigidity of the insulation component 1, can be easily taken into account.

As shown in FIG. 6, the line recesses 30 have a respective cross-sectional shape which forms an undercut in respect of a component thickness direction D1. In particular, the line recesses 30 can have balloon-shaped, Ω-shaped, as shown in FIG. 6, or wedge-shaped cross-sectional shapes. Due to an undercut cross-sectional shape of the line recesses 30, line components P can be fixed in the line recesses 30 with an interlocking fit, without necessitating additional fixing measures.

Furthermore, the line recesses 30 can also have a U-shaped, V-shaped or rectangular cross-sectional shape, in respect of the component thickness direction D1, as shown in FIG. 7. In this respect, it can be provided, in particular, that a first portion in the component thickness direction D1 of the line recess 30 has an undercut cross-sectional shape and a second portion in the component thickness direction D1 of the line recess 30 has a different cross-sectional shape.

As shown in FIG. 7, fixing recesses 31 which run along relative to one another, for example which run in parallel, can be formed in the second surface 1b of the insulation component 1. The fixing recesses 31 can have a respective cross-sectional shape which forms an undercut in respect of a component thickness direction D1. In particular, the fixing recesses 31 can have balloon-shaped, Ω-shaped, as shown in FIG. 7, or wedge-shaped cross-sectional shapes. The fixing recesses 31 may in particular run alongside line recesses 30.

The fixing recesses 31 are configured to receive fixing portions 41 of line half-shells 40, as shown in FIG. 7. The line half-shells 40 can be joined to the insulation component 1 by pressing the fixing portions 41 into the fixing recesses 31. In each case, one line half-shell 40 and generally one line region 1c of the second surface 1b of the insulation component 1 together form a line duct Q. The line region 1*c* of the second surface 1*b* of the insulation component 1 can be formed by a line recess 30.

The line duct Q which can be formed in this way can either form a fluid conduit pipe, for example for an air conditioning system, or a cable duct for receiving power cables and the like. The fixing recesses 31 thus allow the attachment of a line half-shell 40, the cross-sectional surface of the line duct Q, which can be formed in this way, being defined by the line region 1*c* of the second surface 1*b* of the insulation component 1 and by the line half-shell 40. In this way, a large cross-sectional surface of a line duct Q can be achieved, without having to increase the depth of the line recess 30 in the component thickness direction D1, in particular, even without having to form a line recess 30 in the component thickness direction D1. It is thereby possible to achieve large line cross sections without reducing the rigidity of the insulation component 1.

Figure 3:
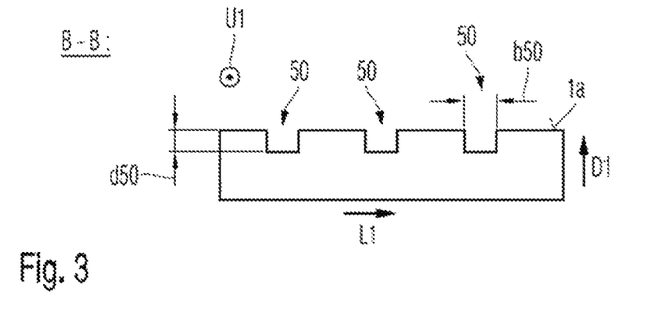
FIG. 3 is a broken-out sectional view of the insulation component shown in FIG. 1, the view resulting from a section along line B-B shown in FIG. 1.

As shown particularly in FIGS. 2 and 3, a multiplicity of condensed water recesses 50 can be formed in the first surface 1*a* of the insulation component 1. They respectively run in the component peripheral direction U1 and can respectively end, for example, in one of the at least one longitudinal recesses 10. The condensed water recesses 50 may, in particular, extend between two longitudinal recesses 10 positioned adjacently in the component peripheral direction U1.

The condensed water recesses 50 are provided so that condensed water which reaches the first surface 1*a* of the insulation component 1, for example by dripping off the fuselage structure onto the first surface 1*a*, can be diverted in the component peripheral direction. For example, condensed water can be directed in this way to the optionally provided longitudinal recesses 50 and can be collected therein. The condensed water can be transported, for example, in that the insulation component 1 is oriented in a state mounted on the fuselage structure such that at least portions of the condensed water recesses 50 run in the direction of gravity. During the attachment of the insulation component 1 to the fuselage structure of an aircraft, this is usually provided in principle, since the orientation of the insulation component 1 in respect of the direction of gravity changes repeatedly during a flight, for example during the execution of direction correctional maneuvers.

As shown in FIG. 3, the condensed water recesses 50 may have in respect of the component thickness direction D1 a depth d50 of between 0.5 mm and 6 mm, and they may have in respect of the component peripheral direction U1 a width b50 of between 1 mm and 10 mm. An effective removal of the condensed water is ensured within these depth and width ranges. Furthermore, these dimensions achieve a weight reduction at which the geometrical moment of inertia and thereby the rigidity of the insulation component in respect of bending around an axis extending in the component longitudinal direction L1 are simultaneously increased.

As shown in FIG. 5, the insulation component 1 can have a condensed water drainage duct 16 which extends between the at least one longitudinal recess 10 and a respective peripheral recess 20. The condensed water drainage duct 16 can be realized, for example, by a hole and is used to convey condensed water, collected in the longitudinal recesses 10, to the peripheral recesses 20. As described above, grooves or regions for further diverting the condensed water can be provided in the peripheral recesses 20. When the insulation component 1 is attached to the fuselage structure of an aircraft, the orientation of the insulation component 1 with respect to the direction of gravity changes repeatedly during the flight of the aircraft, so that it can be assumed that the longitudinal recesses 10 and the peripheral recesses 20 are oriented at least once at least in portions in the direction of gravity during a flight.

The condensed water recesses 50 and the condensed water drainage duct 16 provide a respective controlled removal of condensed water which arrives on the first surface 1*a* of the insulation component 1. In particular, when a plurality of insulation components 1 are mounted on a fuselage structure, as shown in FIG. 11, it is possible to prevent condensed water from passing into the interior 1.

Figure 8:
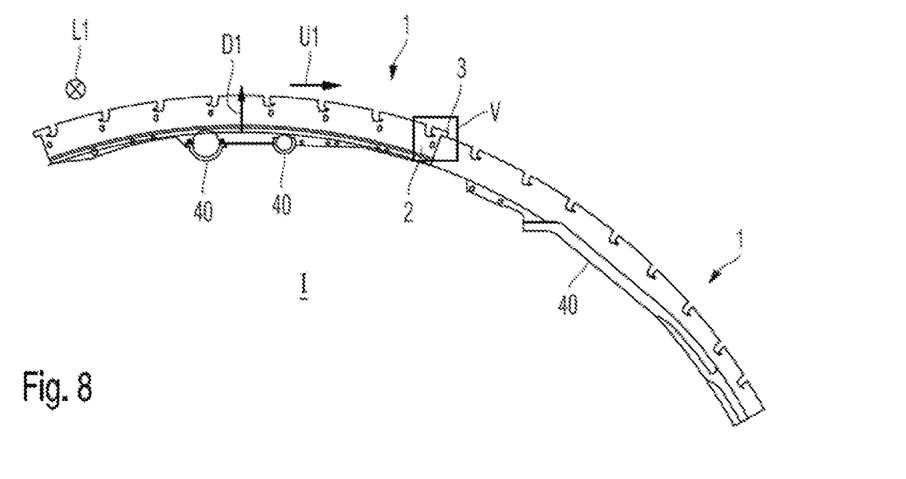
FIG. 8 shows the insulation component in the view shown in FIG. 4 together with a further insulation component, the insulation components being positioned relative to one another in an arrangement provided for a state installed in a fuselage structure.
Figure 10:
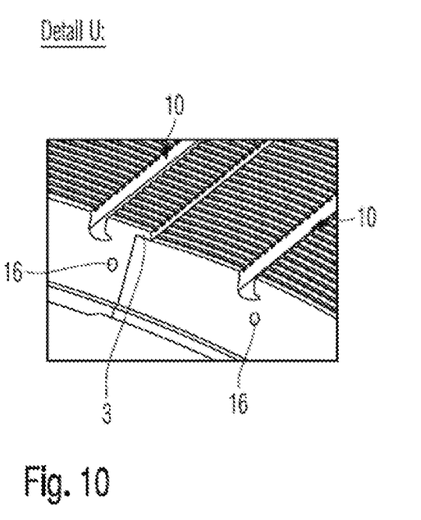
FIG. 10 is a detailed view of the region, identified by character V, of the arrangement, shown in FIG. 8, of insulation components, an overlap state of the insulation components being shown which is an alternative to the first overlap state shown in FIG. 9.

As shown in FIGS. 8 to 10, it can be provided that a cover portion 3 is configured on a first peripheral end portion 2, with respect to the component peripheral direction U1, of the insulation component 1. The cover portion 3 projects, in particular, from an end face 2*s*, extending in the component longitudinal direction L1, of the insulation component 1 in the component peripheral direction U1, or protrudes therefrom. As can be clearly seen in FIGS. 9 and 10, the cover portion 3 continues the first surface 1*a* of the insulation component 1.

The cover portion 3 ensures that respectively two insulation components 1 can be positioned relative to one another while they are being mounted on the fuselage structure such that they abut against one another by their end faces 2*s*, and the cover portion 3 overlaps the first surface 1*a* of the adjacently positioned insulation component 1 in an edge region, as shown in FIGS. 9 and 10.

As shown in FIG. 10, the edge portion, provided for receiving a cover portion 3, of the first surface 1*a* of the insulation component 1 can be offset from the rest of the first surface 1*a* by a discontinuity of the surface course in the component peripheral direction U1, and can form, for example, a bevel or a step. Alternatively, the edge portion, provided for receiving a cover portion 3, of the first surface 1*a* of the insulation component 1 can form a continuous course with the rest of the first surface 1*a* in the component peripheral direction U1, as shown in FIG. 9.

Furthermore, it can be provided that the insulation component has at the first peripheral end portion 2 a cover portion 3 and, at a second peripheral end portion 4, positioned opposite the first peripheral end portion 2 with respect to the component peripheral direction U1, an edge portion, provided for receiving a cover portion 3, of the first surface 1*a*, which is configured in one of the previously described ways.

The insulation component 1 can be formed, in particular, from a thermoplastic foam material. Foam materials based on polyvinylidene fluoride, abbreviated to PVDF, are particularly suitable here. The advantage of thermoplastic foam materials is that they have good insulation properties with a low density and a relatively high rigidity. These materials are also elastically deformable. This is particularly advantageous in respect of the attachment of the installation component 1, because longitudinal supports S of a fuselage structure can be easily pressed in this way into the longitudinal recesses 10 and can be received thereby with an interlocking fit and/or a force fit.

The elastic deformability of the thermoplastic foam material is also advantageous with respect to the fact that the insulation component 1 has at least one peripheral recess 20 for receiving a peripheral support of a fuselage structure. In this way, deformations transverse to the component longitudinal direction L1 can be absorbed within a component longitudinal portion 5, 6, 7, 8 and can also be transferred between them. Consequently, only small deformations occur locally, as a result of which the material is reliably prevented from being damaged.

As shown in the drawings, the first surface 1a of the insulation component 1 can have a convex curvature in the component peripheral direction U1. In particular, this facilitates the assembly of the insulation component 1 to fuselage structures of aircraft. The transportation of condensed water into the condensed water recesses 50 is also promoted thereby.

As shown in the drawings, the second surface 1b of the insulation component 1 can have a concave curvature in the component peripheral direction U1.

Overall, the insulation component 1 can be formed as a panel which is curved in the component peripheral direction U1. In particular, a center line M1 of the insulation component 1 can have a curved course, the center line M1 resulting vertically to the component longitudinal direction L1 in every cross section and having in the respective cross section at each of its points along the component peripheral direction U1 the same distance from a respective point on the first surface 1a and from a point on the second surface 1b of the insulation component 1, the points on the first surface 1a and on the second surface 1b being points with the smallest possible distance from one another.

Furthermore, as shown in FIG. 12, it can be provided that the first surface 1a of the insulation component 1 has a flame-retardant coating, in particular, a coating formed from a fire-resistant material. The coating can be formed, for example, by a thin, sprayed-on metal layer or by a metal foil.

FIG. 11 shows, by way of example, the installed state of insulation components 1 according to the invention in an aircraft. The insulation components 1 are arranged with the end faces 2s resting against one another in the component peripheral direction U1. The longitudinal supports S of the fuselage structure of the aircraft are received in the longitudinal recesses 10, and the peripheral supports T of the fuselage structure are received in the peripheral recesses 20 of the insulation components 1. In particular, the longitudinal supports S are received in the longitudinal recesses 10 in the insulation component 1 with an interlocking fit and/or a force fit, whereby they are fixed on the fuselage structure. The insulation components 1 can also have passage openings (not shown), through which fastening devices which are provided for fastening inner lining parts IV to the fuselage structure can extend in the installed state of the insulation components 1.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft insulation component for attachment to a fuselage structure of an aircraft, wherein the insulation component extends in a planar manner in a component longitudinal direction corresponding to a fuselage longitudinal axis and wherein at least one peripheral recess, running in a component peripheral direction which runs transversely to the component longitudinal direction, is formed in a first surface of the insulation component configured to receive a respective associated peripheral support of the fuselage structure, wherein formed in the first surface of the insulation component are a multiplicity of condensed water recesses formed on opposing sides of the at least one peripheral recess configured to allow water to flow in the component peripheral direction.

2. The insulation component according to claim 1, wherein the insulation component has at least one longitudinal recess, running along the component longitudinal direction and transversely to the at least one peripheral recess, configured to receive a respective associated longitudinal support of the fuselage structure.

3. The insulation component according to claim 2, wherein the at least one longitudinal recess has an L-shaped cross-sectional shape configured to receive an extension formed on the first longitudinal support.

4. The insulation component according to claim 2, wherein the insulation component has a condensed water drainage duct which extends between the at least one longitudinal recess and a respective peripheral recess.

5. The insulation component according to claim 1, wherein line recesses, at least one of which configured to receive line components, or for the formation at least in part of a line duct, are formed in a second surface of the insulation component, which is oriented opposite the first surface.

6. The insulation component according to claim 5, wherein the line recesses have a respective cross-sectional shape which forms an undercut with respect to a component thickness direction.

7. The insulation component according to claim 5, wherein the line recesses have a U-shaped, V-shaped or rectangular cross-sectional shape with respect to the component thickness direction.

8. The insulation component according to claim 1, wherein a plurality of fixing recesses, which run along relative to one another, are formed in a second surface of the insulation component, each fixing recess configured to receive a corresponding fixing portion of a line half-shell.

9. The insulation component according to claim 8, wherein the fixing recesses have a respective cross-sectional shape which forms an undercut with respect to the component thickness direction.

10. The insulation component according to claim 1, wherein the condensed water recesses have a depth of between 0.5 mm and 6 mm with respect to the component thickness direction, and a width of between 1 mm and 10 mm with respect to the component peripheral direction.

11. The insulation component according to claim 1, wherein formed on a first peripheral end portion of the insulation component, with respect to the component peripheral direction, is a cover portion which projects in the component peripheral direction from an end face, extending in the component longitudinal direction, of the insulation component and which continues the first surface of the insulation component.

12. The insulation component according to claim 1, wherein the insulation component is formed from a thermoplastic foam material.

13. The insulation component according to claim 1, wherein the first surface of the insulation component has a convex curvature in the component peripheral direction.

14. The insulation component according to claim 1, wherein the first surface of the insulation component has a flame-retardant coating.

15. An aircraft insulation component for attachment to a fuselage structure of an aircraft, wherein the insulation component extends in a planar manner in a component longitudinal direction corresponding to a fuselage longitudinal axis, the insulation component comprising:
- at least one peripheral recess, running in a component peripheral direction which runs transversely to the component longitudinal direction, is formed in a first surface of the insulation component configured to receive a respective associated peripheral support of the fuselage structure;
- at least one longitudinal recess, running along the component longitudinal direction and transversely to the at least one peripheral recess, configured to receive a respective associated longitudinal support of the fuselage structure,
- wherein the at least one longitudinal recess has an L-shaped cross-sectional shape configured to receive an extension formed on the respective associated longitudinal support,
- wherein a leg of the L-shaped cross-sectional shape defines a fixing slot having a slot opening transverse to an opening of the at least one longitudinal recess formed in the first surface of the insulation component, the fixing slot configured to receive the extension formed on the respective associated longitudinal support which extends in the component peripheral direction.

* * * * *